(12) United States Patent
Wang et al.

(10) Patent No.: US 9,086,669 B2
(45) Date of Patent: Jul. 21, 2015

(54) REUSABLE PRINTING MEDIUM AND APPARATUS AND METHOD EMPLOYING THE SAME

(75) Inventors: HaoChuan Wang, S. Pasadena, CA (US); Timothy L. Paris, Van Nuys, CA (US); Chia-Hsi Chu, Arcadia, CA (US); David N. Edwards, Pasadena, CA (US); Adrian J. Hulme, Mentor, OH (US)

(73) Assignee: Avery Denninson Corporation, Glendale, CA (US)

( * ) Notice: Subject to any disclaimer, the term of this patent is extended or adjusted under 35 U.S.C. 154(b) by 121 days.

(21) Appl. No.: 13/145,234

(22) PCT Filed: Jan. 19, 2010

(86) PCT No.: PCT/US2010/021438
§ 371 (c)(1),
(2), (4) Date: Jul. 19, 2011

(87) PCT Pub. No.: WO2010/083535
PCT Pub. Date: Jul. 22, 2010

(65) Prior Publication Data
US 2011/0305851 A1 Dec. 15, 2011

Related U.S. Application Data

(60) Provisional application No. 61/145,686, filed on Jan. 19, 2009.

(51) Int. Cl.
*B41M 5/52* (2006.01)
*B41M 7/00* (2006.01)
*B41N 3/00* (2006.01)
*G03G 15/00* (2006.01)
*C09D 11/00* (2014.01)

(52) U.S. Cl.
CPC ............. *G03G 15/6588* (2013.01); *B41M 5/52* (2013.01); *B41M 7/0009* (2013.01); *C09D 11/00* (2013.01); *B41M 5/5272* (2013.01); *B41N 3/006* (2013.01); *G03G 2215/00447* (2013.01); *G03G 2215/00518* (2013.01)

(58) Field of Classification Search
CPC .. B41M 5/5263; B41M 5/529; B41M 7/0009; B41M 2205/18
USPC ............................ 427/271; 428/32.31; 430/19
See application file for complete search history.

(56) References Cited

U.S. PATENT DOCUMENTS

| 5,678,157 | A | 10/1997 | Yoshida |
| 5,709,926 | A * | 1/1998 | Gust .............................. 428/206 |
| RE37,645 | E | 4/2002 | Takahashi |
| 2006/0062997 | A1 | 3/2006 | Murakami |

FOREIGN PATENT DOCUMENTS

EP 1564017 8/2005

OTHER PUBLICATIONS

International Search Report and Written Opinion issued in corresponding IA No. PCT/US2010/021438 dated Aug. 16, 2010.
Invitation to Pay Additional Fees issued in corresponding IA No. PCT/US2010/021438 dated Apr. 23, 2010.

* cited by examiner

*Primary Examiner* — Bruce H Hess
(74) *Attorney, Agent, or Firm* — Avery Denninson Corporation (57) ABSTRACT

An erasable and/or reusable image receiving medium (62) is disclosed along with a system (10) and/or method for using the same, including a unit (60) and/or method for erasing the reusable medium (62).

16 Claims, 3 Drawing Sheets

REUSABLE PRINTING MEDIUM AND APPARATUS AND METHOD EMPLOYING THE SAME

CROSS-REFERENCE TO RELATED APPLICATION

The present application is a 371 of International Patent Application No. PCT/US2010/021438, which was published in English on Jul. 22, 2010. International Application No. PCT/US2010/021438 claims priority from U.S. Provisional Application No. 61/145,686 filed on Jan. 19, 2009. Said applications are incorporated herein by reference in their entireties.

BACKGROUND OF THE INVENTION

The present inventive subject matter relates generally to the art of reusable printing mediums and devices and/or methods for using the same. Particular relevance is found in connection with xerography and/or electrophotography, and accordingly the present specification makes specific reference thereto. However, it is to be appreciated that aspects of the present inventive subject matter are also equally amenable to other like applications.

Despite the proliferation of various forms of electronic and/or digital media, there is still a desire to print or copy or otherwise output documents and the like on paper and/or other similar image receiving mediums. That is to say, reading or otherwise viewing a document (e.g., especially a multi-page document) on an electronic display or the like may be undesirable to some users, e.g., due to the limited viewing area or size of the electronic display. In short, reading and/or viewing documents on electronic displays and the like can be inconvenient and can tend to reduce work productivity. The reading and/or viewing of documents in electronic format (i.e., as opposed to hardcopy format) also tends to limit the business opportunities for sellers of toner and/or other like printing supplies. Accordingly, the desire to print or otherwise output documents and the like onto paper or other like mediums (e.g., to read or otherwise view the same) still remains.

Nevertheless, document storage and/or retention on paper or other like mediums may often be deemed undesirable, especially when electronic storage of the documents is readily available. The desire to read or view documents on paper or another like medium, while not intending to retain the documents on the paper or other like medium, can lead to inefficient and/or wasteful use of the paper or other medium on which the documents are printed or otherwise output. That is to say, many documents and the like printed or otherwise output on paper or another like medium frequently have a relatively limited or short useful lifespan. For example, many so called hardcopy documents, such as meeting hand-outs, newspapers and other reading materials, are routinely disposed of after viewing.

The aforementioned practice of creating then disposing of hardcopy documents and the like can tend to incur significant expense, especially when widely implemented, e.g., within an organization or other enterprise. In particular, there are often financial costs incurred for the procurement of the paper or other medium on which the documents are printed or otherwise output, and there are also environmental costs typically associated with the practice. Moreover, these costs tend to be incurred regardless of whether or not the disposed paper or other like medium is ultimately recycled. That is to say, even if the disposed paper or other like medium is recycled, there are costs commonly associated with the recycling process, e.g., there may be various costs associated with the collection of the materials to be recycled, there may be various costs associated with the energy used to power the recycling plants, etc. Additionally, if private or otherwise confidential information is output in hardcopy format, there can be additional costs associated with protecting that information when the hardcopy is disposed, e.g., such as costs associated with shedding or otherwise destroying the paper or other like medium bearing the confidential information.

Accordingly, a new and/or improved reusable printing medium is disclosed which addresses the above-referenced problem(s) and/or other(s), along with a new and/or improved device and/or method for using the same.

SUMMARY OF THE INVENTION

In accordance with one embodiment, an erasable and/or reusable image receiving medium is provided. In particular, the medium includes: a substrate, and a coating providing an image receiving surface on the substrate, the coating be configured such that a marking agent forming an image on the image receiving surface is able to be selectively removed from the medium in response to an applied erasing operation.

In accordance with another embodiment, a system and/or method is provided for processing the aforementioned erasable/reusable image receiving media. In particular, a device for processing the media includes: an erasing station for applying an erasing operation to the erasable media, the erasing operation removing from the erasable media at least a portion of a marking agent forming an image on a surface of the erasable media. Suitably, the erasing station including: a support for holding the erasable media; and, an eraser for removing at least a portion of the marking agent from the erasable media.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter disclosed herein may take form in various components and arrangements of components, and in various steps and arrangements of steps. The drawings are only for purposes of illustrating preferred embodiments and are not to be construed as limiting. Further, it is to be appreciated that the drawings may not be to scale.

DETAILED DESCRIPTION OF THE EMBODIMENTS

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

The present specification discloses an erasable and/or reusable image receiving medium along with a method and/or system for using the same. As disclosed herein, the aforementioned image receiving medium is able to receive and sufficiently hold an image formed thereon, and at a subsequent time, the image can be selectively removed and/or substantially erased as desired so that the image receiving medium can be used again. In particular, a method and/or system is disclosed which digitally prints, copies or otherwise outputs an image on the erasable/reusable medium. The image output on the erasable/reusable medium may selectively include, e.g., any desired graphics, data, information, text, pictures or other indicia obtained from a suitable image source or other input. Suitably, the image is formed on the erasable/reusable medium from toner, ink, or other like marking agents applied thereto, e.g., by a suitable marking engine (i.e., a printer, copier, multi-function device (MFD), etc.). For example, the marking engine may be a laser or other xerographic marking engine, an ink jet marking engine or the like, a solid-ink marking engine, etc.

Removal of an image from the erasable/reusable medium is suitably accomplished by one or more of a variety of techniques and/or means. In one suitable embodiment, one or more mechanical erasure processes are employed to remove the marking agent from the erasable/reusable medium. Such mechanical erasure processes, e.g., include but are not limited to rubbing, scraping, etc. In other optional embodiments, heat may be applied (e.g., to liquefy or gasify the marking agent); differential adhesion may be used (e.g., to peel the marking agent away from the erasable/reusable medium); washing may be used; a sacrificial layer may be employed on the erasable/reusable medium; chemical application (e.g., of solvents or other constituents) may be employed; UV or other irradiation of the medium may be used; and other suitable techniques may be employed to remove or assist in removing the marking agent from the erasable/reusable medium or at least weaken the bond or adhesion of the marking agent to the underlying erasable/reusable medium.

Optionally, the erasing process is carried out by an erasing station which could or could not be in the same device as a marking station which incorporates the marking engine. In the former case, a printer or other device may have at least one media input tray or the like which receives the reusable media (with or without markings already thereon). Accordingly, the device will have an erasing station that ensures that any previous markings will be erased before printing new markings. Optionally, previous marking could be erased within a certain time limit after they are inserted into the tray, e.g., to promote confidentiality and privacy. On the other hand, the erasing station may be separate from the marking station. In this case, the printer or other like device would have at least one media input tray or the like to receive reusable media without markings. There would also be a special erasing device for receiving the reusable media, erasing any markings thereon, and outputting clean erased reusable media. The erased reusable media could be then transported into the tray of the printer by hand or by other automatic means.

Figure 1:
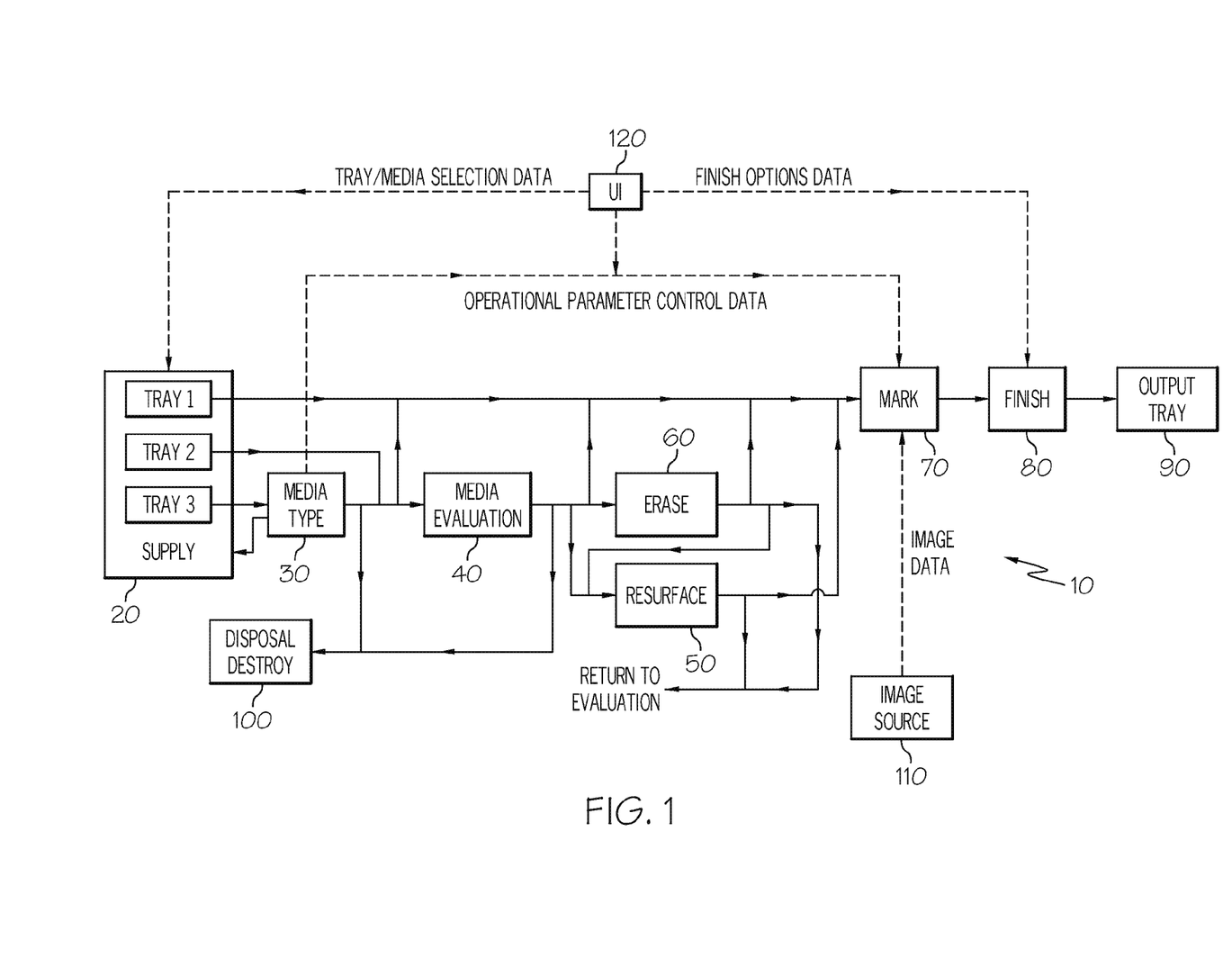
FIG. 1 is a diagrammatic illustration showing a system in accordance with aspects of the present inventive subject matter suitable for use with erasable/reusable image receiving media.

The embodiment shown in FIG. 1 includes both a marking station and an erasing station built in the same device. Suitably, after erasing and evaluating a reusable media, the media is feed directly into the marking station. Alternately, in one suitable embodiment, instead of being fed directly to the marking station, optionally, the cleaned/erased reusable media may be stored in a media tray for future printing. In which case, for future marking, the device will pull sheets from the tray storing cleaned sheets (i.e., instead of pulling directly from the erase station) unless the tray of cleaned sheets is detected to be empty. Of course, other embodiments are also contemplated. For example, one other embodiment is that the erasing station and the marking station are built in separate devices. Still another embodiment is that the erasing station and the marking station are built together but the erasing and marking is not synchronized in that the erasing station has its own input and output tray. The marking station then takes sheets on an as demanded basis from the output tray of the erasing station. In any event, optionally, the means of detecting and evaluating the reusable media described below may be employed.

Optionally, the marking engine includes: one or more marking stations that apply the marking agent to the erasable/reusable medium; one or more suitable erasing stations that erase an image or otherwise remove at least a portion of the marking agent from the underlying erasable/reusable medium; and/or one or more suitable surface treatment stations for surface repair, refinishing and/or resurfacing of the erasable/reusable medium. Alternately, any one or more of these functions are optionally performed on or by one or more separate devices.

Suitably, one or more sensors and/or other evaluation means and/or techniques are employed (e.g., implemented in a media or fitness evaluation station) to automatically evaluate sheets of the erasable/reusable medium to determine their fitness for further reuse. Optionally, sheets of the erasable/reusable medium deemed sufficiently fit to warrant further reuse can be forwarded to the marking station (i.e., for application of another image), while sheets of the reusable medium deemed sufficiently deficient or degraded can be rejected and optionally routed away from the marking station (e.g., where they can be destroyed or disposed of or otherwise handled as desired). Suitably, selective utilization and/or bypassing of the surface treatment station can also be dependent on the evaluated condition of the reusable medium.

In one suitable embodiment, the marking engine is designed to apply the marking agent only to sheets of erasable/reusable medium, in which case, the operational parameters (e.g., fusing temperature and/or pressure) of the marking station are set accordingly, e.g., to achieve a desired bonding or adhesion of the marking agent to the erasable/reusable medium. Alternately, however, the marking engine is designed to apply a marking agent to both sheets of standard (i.e., non-erasable/reusable) mediums (e.g., paper, transparencies, etc.) as well as sheets of erasable/reusable medium. Accordingly, the operational parameters of the marking station are optionally varied depending on the type of medium being used for a particular job. Suitably, separate media supply trays are provided for sheets of the standard medium and sheets of the erasable/reusable medium. Optionally, one or more sensors and/or other detection means and/or techniques (e.g., implemented in a media type detection station) are used to determine and/or designate the type of medium from which a supplied sheet is made, and the operational parameters of the marking station are optionally adjusted automatically in accordance therewith.

Optionally, one or more sensors and/or other suitable means and/or techniques (e.g., also implemented via the media and/or fitness evaluation station or optionally separately implemented) are also used to determine if a supplied sheet of erasable/reusable medium has to be erased before it is ready to be marked. Accordingly, if the supplied sheet has already been erased or is otherwise sufficiently unmarked, then the erasing station or erasing operation is optionally bypassed on the sheet's way to the marking station, otherwise if the supplied sheet has not yet been erased or is otherwise sufficiently marked, then the erasing station is utilized and/or activated for that sheet of the erasable/reusable medium. In this manner, an otherwise already clean sheet of the erasable/reusable medium is not unduly subjected to the erasing procedure, thereby promoting an extended lifespan of the particular sheet of erasable/reusable medium.

With reference now to FIG. 1, there is illustrated an exemplary system 10 that is suitable for use with an erasable/reusable image receiving medium. In essence, the system 10 may be any conventional marking engine (i.e., printer, copier, MFD, etc.) which is suitably modified and/or otherwise adapted for use with an erasable/reusable image receiving medium. More specifically, in the illustrated embodiment, the system 10 includes:

- a media supply station 20 from which sheets of selected media are supplied, e.g., in accordance with the parameters of a particular print job or other suitable job;
- an optional media type detection station 30 that detects the type of media supplied thereto (i.e., a supplied sheet is detected and/or designated as being made from either a standard non-erasable/reusable medium or an erasable/reusable medium);
- a media and/or fitness evaluation station 40 that detects and/or otherwise determines, e.g., at least one of (i) whether or not a supplied sheet of the erasable/reusable media is fit for reuse, (ii) whether or not a supplied sheet of the erasable/reusable media has to be erased before being reused or otherwise marked, and/or (iii) whether or not a supplied sheet of the erasable/reusable media is to be sent to an optional surface treatment station 50 for optional surface repair, refinishing and/or resurfacing of the media;
- the aforementioned optional surface treatment station 50 that is optionally utilized to (i) repair and/or refinish a damaged or degraded image receiving surface of the erasable/reusable medium and/or (ii) apply an optional sacrificial layer to the image receiving surface of the erasable/reusable medium;
- an erasing station 60 that selectively removes at least a portion of an image forming marking agent from the erasable/reusable medium;
- a marking station 70 that selectively applies at least one marking agent (e.g., toner, ink, etc.) on the supplied medium to form an image (e.g., including graphics, pictures, text, data, information or other indicia) thereon;
- an optional finishing station 80 that applies finishing processes and/or operations (e.g., such as folding, stapling, cutting, hole punching, binding, etc.) to jobs in accordance with selected job parameters;
- an optional output tray 90 that receives a finished job;
- an optional media destruction station and/or disposal tray 100 that destroys and/or otherwise receives rejected sheets of media;
- an image input source 110 that provides image data to the marking station 70; and,
- an optional user interface (UI) 120 by which a user can select various job parameters and/or otherwise control selected operations of the system 10.

In the illustrated embodiment of FIG. 1, the system 10 is suitably configured to accept both a standard type of image receiving medium (i.e., non-erasable/reusable) and an erasable/reusable image receiving medium as disclosed herein. Optionally, separate trays (i.e., nominally labeled trays 1 and 2) are provided in the media supply station 20 to hold respectively sheets of the different media types. For example, as shown, tray 1 is optionally loaded with and/or otherwise holds only sheets of the standard media type, while tray 2 is optionally loaded with and/or otherwise holds only sheets of the erasable/reusable media type. Accordingly, when a job calls for standard media, the media supply station 20 optionally outputs one or more sheets (as demanded by the job) from tray 1. In this case, the standard sheets of media supplied by the media supply station 20 can optionally bypass otherwise intervening stations relevant to erasable/reusable medium and proceed directly to the marking station 70. Conversely, when a job calls for erasable/reusable media, the media supply station 20 optionally outputs one or more sheets (as demanded by the job) from tray 2. In this case, the erasable/reusable sheets of media undergo selective processing by one or more of the intervening stations relevant to the erasable/reusable media before proceeding to the marking station 70 or other final destination as the case may be.

In one suitable embodiment, a given tray of the media supply station 20 (e.g., tray 3 in the illustrated embodiment) may be loaded with and/or otherwise hold both types of media, either simultaneously or at alternate times. In this case, sheets supplied from a combined media tray (such as tray 3) can first be routed to the media type detection station 30 that employs one or more sensors and/or other detection means and/or techniques to determine and/or designate the type of medium from which a supplied sheet is made. If the detected media type is appropriate for the current job being run, then as the case may be the respective sheet is forward to and/or processed by the next appropriate station—i.e., standard sheets of media can optionally bypass otherwise intervening stations relevant to erasable/reusable medium and proceed directly to the marking station 70, while erasable/reusable sheets of media are forwarded to and/or undergo selective processing by one or more of the intervening stations relevant to the erasable/reusable media before proceeding to the marking station 70 or their other final destination. Conversely, if the detected media type is not appropriate for the current job being run, then the sheet is optionally returned to the media supply station 20. Optionally, sheets detected to be of the wrong media type may be returned to the same supply tray from which they originated or alternately to another tray designated for and/or matching the detected media type of the particular sheet in question. Alternately, sheets detected to be of the wrong media type may be forwarded to the media disposal station 100 (e.g., where they can be collected and optionally reloaded manually into the media supply station 20). In any event, if the wrong media type for a job is detected by the media type detection station 30, the job may optionally be halted or suspended and the user optionally notified (e.g., via the UI 120) of the fault condition. In one suitable embodiment, the media supply station 20 may make one or more additional attempts to provide the appropriate media type for the job before job suspension and/or indication of a fault condition. Additional attempts may optionally be made from the same or different supply trays until the appropriate media type is detected or some set or otherwise determined attempt limit is reached.

Suitably, tray and/or media selection data for a given job is provided to the media supply station 20 via the UI 120 or alternately it is provided (e.g., along with other job parameters) from a computer or the like operatively communicating with the system 10 and/or submitting the job. Tray and/or media selection data may optionally identify a specified tray from which sheets of media are to be selected (in which case the media supply station 20 simply complies), or alternately, it may identify a specific media type which is desired for the job (in which case the media supply station 20 optionally selects a particular tray designated for the identified media type). In the later case, if no tray is specifically designated for the desired media type selected in connection with a given job, then optionally sheets of media from different trays are sampled and submitted to the media type detection station 30 to determine which (if any) tray is holding the desired media type for the job being run.

In the illustrated embodiment, the system 10 is configured to accept both media types (i.e., standard and erasable/reusable). Accordingly, the marking station 70 is optionally provisioned with selectively variable operating parameters to accommodate both media types. For example, in one optional embodiment the marking station 70 may include a xerographic marking engine in which parameters such as fusing temperature and/or pressure are optionally set to a first combination of determined values when standard media is selected (i.e., for non-erasable/reusable media jobs) and a second different combination of determined values when erasable/reusable media is selected (i.e., for erasable/reusable media jobs). In this regard, it is to be appreciated that by employing selectively variable operating parameters for the marking station 70, the degree to which the marking agent bonds or adheres to the underlying media can be controlled or regulated to some extent. Accordingly, for erasable/reusable jobs, it may be desirable for the bond or adhesion between the marking agent and media to be relatively weaker as compared to non-erasable/reusable jobs.

Suitably, the operating parameters of the marking station 70 are selected and/or set based on the media selection for a particular job. For example, operating parameters (such as fusing temperature and/or pressure) of the marking station 70 may optionally be controlled in response to media selection data obtained from the UI 120 or obtained along with other data submitted with the job from a computer operatively connected and/or communicating with the system 10 or in response to a media type determination made by the media type detection station 30.

Presuming erasable or reusable media is selected for a job from the media supply station 20, suitably the media is forwarded to a media and/or fitness evaluation station 40. Via suitable sensors or other detecting means and/or techniques employed to conduct observations and/or evaluations of the media, the evaluation station 40 optionally determines based upon those observations and/or evaluation of the media which (if any) further processing operations are to be performed on the media (e.g., prior to marking or forwarding to another ultimate destination). For example, the evaluation station 40 suitably determines at least one of the follow:

whether or not a sheet of the erasable/reusable medium is fit or unfit for further reuse;

whether or not a sheet of the erasable/reusable medium should be erased before receiving further marking; and/or whether or not it is appropriate for a sheet of the erasable/reusable medium to have surface repairs and/or refinishing performed thereon or have a sacrificial layer applied thereto.

While the erasable/reusable medium is intended to be used repeatedly, it is nevertheless generally a consequence that after some number of repeat uses a sheet of the medium may become damaged or degraded to some degree, e.g., as the result of repeated erasing operations and/or other repeated handling. If sufficiently damaged or degraded, the evaluation station 40 optionally determines that a sheet is unfit for further use, and optionally forwards the sheet in question to the media destruction station and/or disposal tray 100. Conversely, if significant damage or degradation is not detected, the sheet may be deemed fit for further reuse.

In one suitable embodiment, the evaluation station 40 is provisioned with sensors or other suitable means to observe and/or evaluate the physical characteristics and/or property of a sheet to determine fitness. For example, the sensors may be employed to optionally inspect the sheet for tears, scratches, surface defects, etc. Accordingly, depending upon the amount and/or extent of detected wear indicators such as these, the sheet is deemed either fit or unfit for further reuse and accordingly forwarded to subsequent stations as appropriate for the given result. For example, fit sheets of media may ultimately be advanced to the marking station 70 while unfit sheets of media can be sent to the media destruction station and/or disposal tray 100.

In an alternate embodiment, the evaluation station 40 is optionally configured to track the number of times a particular sheet of erasable/reusable media has been used. Consequently, if it is determined that the sheet in question has already been used over some threshold number of times, then it can be deemed to no longer be fit for further reuse, otherwise if it is determined that the sheet in question has not been used more than the threshold number of times, then it can be deemed fit for at least one further use. Optionally, in order to track the number of times a particular erasable/reusable sheet has been used, each sheet is provided with an indicator that communicates the same to the evaluation station 40. Suitably, the indicator may be relatively inconspicuous upon casual observation of the sheet of media and/or does not interfere with or obscure images ultimately formed on the medium. For example, the indicator may comprise markings or indicia placed in unobtrusive locations on the media, e.g., in the margins or on the back surface or edge of the media. The markings may be small in size and/or light in intensity to further promote their inconspicuous nature. Optionally, the markings may be made with a toner, ink or other marking agent that is largely invisible under normal lighting conditions but may be visible under a particular spectrum of radiation, e.g., such as UV or Infrared (IR). In any event, optionally, the marking station 70 applies the appropriate marking or indicia each time an erasable/reusable sheet of media is passed therethrough or otherwise used. In this way, the applied markings or indicia serve as an incremental counter and/or otherwise reflect the number of uses that sheet of media has experienced. Of course, in this case, the evaluation station 40 is optionally equipped or otherwise provisioned to observe or read and interpret these markings and/or indicia. Suitably, the use indicating marking or indicia contained in or on a sheet of erasable/reusable media are not removed therefrom by erasing operations, e.g., such as those executed by the erasing station 60.

Alternately, the erasable/reusable medium may be provisioned with a Radio Frequency IDentification (RFID) tag or other like device which records the number of uses. In this embodiment, suitably, the marking station 70 or other suitable station is equipped and/or otherwise provisioned to write use data to the RFID device and the evaluation station 40 is provisioned with an RFID reader or the like to read the use data from the RFID device. Suitably, the RFID writer may simply increment a counter on the RFID device each time the sheet is used.

In one suitable embodiment, if an erasable/reusable sheet is deemed unfit by the evaluation station 40 for further or additional reuse, then optionally the sheet in question is routed to the media destruction station and/or disposal tray 100. Optionally, when forwarded to the station or tray 100 the media is destroyed. For example, the station 100 is optionally equipped with a shredder or the like that shreds or otherwise destroys the received media. In this manner, additional reuse is further precluded and/or potentially sensitive information on the disposed media is protected. In another effort to protect potentially sensitive information on disposed of media, optionally sheets are first routed to the erasing station 60 for erasure prior to being received at the media destruction station or disposal tray 100.

As can be appreciate, a sheet of erasable/reusable media may not always have to be erased prior to its use. For example, the first time such a sheet is used it generally will not have any image printed or otherwise formed thereon, or a sheet may have been previous erased, e.g., by an outside device or process. Accordingly, subjecting the otherwise blank sheet to an erasing operation may unduly wear the sheet when erasing is generally not demanded. Consequently, the evaluation station 40 optionally also performs a check on the sheet to determine if in fact erasing is appropriate before further reuse of the sheet. To this end, the evaluation station 40 is suitably equipped or otherwise provisioned with sensors or other means and/or techniques by which observations and/or evaluations of the sheet are carried out from which a determination can be made whether or not to subject the sheet to erasing. Suitably, such observations and/or evaluations determine whether or not a sheet is sufficiently blank or free of marking agent. Accordingly, a sheet that is sufficiently blank or free of marking agent can forego erasing operations (e.g., by bypassing the erasing station 60 before proceeding to the marking station 70), while a sheet that in not blank or that has greater than a threshold level of marking agent thereon is subjected to the operation of the erasing station 60 prior to being forwarded to the marking station 70. In one suitable example, a scanner provided in the evaluation station 40 may obtain a digital or other representation of the sheet in question or otherwise scan the sheet in question. Accordingly, each pixel or other like unit in the scanned representation having an intensity value over a determined threshold can then be deemed as marked, and if the number of marked pixels exceeds a given threshold, then the sheet can be deemed as not blank, otherwise if the number of marked pixels is below the threshold, then the sheet can be deemed as sufficiently blank. Alternately, an average, mean, median or other statistical analysis of the scanned intensity levels can be used to determine whether or not the sheet is sufficiently blank.

In one embodiment, the system 10 optionally includes a surface repair or refinishing station 50. At this station, optionally one or more of the following processes or operation are executed:

repairing and/or refinishing a damaged or degraded image receiving surface of the erasable/reusable medium; and/or applying an optional sacrificial layer to the image receiving surface of the erasable/reusable medium.

When the system 10 is configured with the station 50, optionally, the media evaluation station 30 may decide that while a sheet may be somewhat damaged or degraded to a less than desirable degree, it may still be salvageable with appropriate resurfacing or surface repair, and accordingly, the sheet is routed to the station 50 for this resurfacing or surface repair. Alternately, when a sacrificial layer is employed on the erasable/reusable medium, the sheet may also be routed to the station 50 to receive this layer. The resurfacing operation may involve mechanical, heat, chemical and/or other appropriate treatments to restore or rejuvenate the image receiving surface and/or layer of the erasable/reusable medium. In another optional embodiment, the resurfacing operation and/or provision of a sacrificial layer may optionally be performed by the station 50 via application of a suitable film or other material or other layer on the image receiving surface or side of the media. Optionally, remnants of the old image receiving surface or layer are first removed by the station 50 to expose a substantially clean underlying substrate or carried layer. As appropriate, the underlying substrate can be treated or otherwise suitably prepared by the station 50 in order to achieve a desired bond and/or adhesion or other junction with the newly applied image receiving surface and/or sacrificial layer. Upon completion of selected operations by the station 50, optionally the media is returned to the evaluation station 40 to confirm sufficient fitness for further use has been achieved. Alternately, achievement of the desired fitness for further reuse may be assumed and the media may simply be advanced to the marking station 70.

The erasing station 60, as the name implies, is where the erasable/reusable medium is erased, i.e., where at least a portion of the marking agent (e.g., toner, ink, etc.) forming an image on the erasable/reusable medium is removed therefrom. Depending on a number of factors, e.g., including the type of marking agent, the construction of the erasable/reusable medium in question, and the degree of bonding and/or adhesion between the two, one or more various operations and/or processes are optionally employed by the erasing station 60 to achieve the desired goal. In one suitable embodiment, one or more mechanical erasure processes are employed to remove the marking agent from the erasable/reusable medium. Such mechanical erasure processes, e.g., include but are not limited to rubbing, scraping, etc. In other optional embodiments, heat may be applied (e.g., to liquefy or gasify the marking agent); differential adhesion may be used (e.g., to peel the marking agent away from the erasable/reusable medium); washing may be used; a sacrificial layer may be employed on the erasable/reusable medium; chemical application (e.g., of solvents or other constituents) may be employed; UV or other irradiation of the medium may be used; and other suitable techniques may be employed to remove or assist in removing the marking agent from the erasable/reusable medium or at least weaken the bond or adhesion of the marking agent to the underlying erasable/reusable medium. Specific examples for achieving erasure will be discussed in greater detail below.

Suitably, after the erasing station 60 has performed its erasing operation(s), the sheet is optionally retuned to the evaluation station 40 to confirm that sufficiently successful erasure has been achieved and that the sheet is still sufficiently fit for further reuse. In one suitable embodiment, if surface repair or refinishing is desired or if application of a sacrificial layer is to be performed, then the sheet may optionally be routed from the erasing station 60 to station 50. Alternately, if resurfacing and/or application of a sacrificial layer is not being performed, upon completion of the erasing process by the erasing station 60, sufficiently successful erasure without significant further degradation to the medium can optionally be assumed and the sheet forwarded on, e.g., to the marking station 70.

Once a sufficiently fit and/or sufficiently blank sheet of the erasable/reusable medium has been achieved, it is optionally forwarded, advanced or otherwise submitted to the marking station 70. The marking station 70 applies marking agents (i.e., toner, ink, etc.) to the received media to form an image thereon in accordance with received image data from an image source 110. For example, the image source may be a scanner or a computer or the like operatively connected to and/or in communication with the system 10 for submitting a print or copy or facsimile or other like job thereto. Optionally, the marking station 70 may be implemented via any suitable xerographic marking engine. As mentioned earlier, the variable operating parameters (e.g., such as the fusing temperature and/or pressure) of the marking station 70 are optionally controlled based on the selected and/or detected media type.

Optionally, the system 10 also includes a finishing station 80. Suitably, sheets of media a received at the finishing station 80 from the marking station 70 after image forming the marking agent has been applied. The finishing station 80 is optionally equipped and/or otherwise provisioned to perform any number of conventional finishing operations (e.g., such as folding, stapling, cutting, hole punching, binding, etc.) in accordance with job parameters. Suitably, desired finishing options to be performed by station 80 are optionally selected via the UI 120 or alternately they accompany other job data received, e.g., from a computer or the like operatively connected to and/or in communication with the system 10 for submitting a print or copy or facsimile or other like job thereto. Once the finishing station 80 has completed its operations, optionally the completed document or job is deposited in the output tray 90, e.g., so as to be ready for convenient collection by the user.

The imaging method in accordance with at least one embodiment of the present inventive subject matter is xerography (or electrophotography). As is understood in the art, xerography is widely used in photocopying machines and in laser and LED (light emitting diode) printers. Generally, in xerography, an electrical charge is used to pattern a marking agent (namely toner particles), and then a heat transfer process is used to adhere/fuse the toner onto a receiving media. Commonly, the toner is made of organic resin, colorant such as pigment or dyes, etc. The organic resins are mainly low molecular weight resins that have glass transition or melting temperatures above room temperature. Upon heating the toner flows onto the surface of the receiving media; and upon cooling the toner binds and adheres to the surface of the media.

The adhesion mainly depends on the formulation of the toner as well as the composition and structure of the receiving surface of the media to which the toner is applied. The adhesion also generally depends on the fusion temperature and pressure at which the toner was applied to the image receiving medium. Generally, a low enough fuser temperature will cause the toner to only partially melt and thus have less adhesion strength on the media. Likewise, a low enough pressure or even no-pressure will generally cause the toner to have less surface contact with the media and thus have a relatively lower adhesion strength.

The following table shows factors that affect the adhesion between the toner and media to which it is applied. In general, good adhesion allows the printing or marking (e.g., the toner image on the media) to be more durable (i.e., survive more harsh usage), which is a generally desired property. Poor adhesion, on the other hand, allows the printing or marking to be easily removed, e.g., by mechanical ways, which is a generally desired property for erasable applications. As can be appreciated, the desirable features of good erasability and good durability impart contradicting demands with respect to toner adhesion. Suitably, a good balance is found to obtain acceptable durability for temporary printing/marking and easy mechanical or other erasure with minimal damage to the media. Advantageously, this well balanced adhesion is also maintained largely consistent during the life-cycle of the media.

| Factors | Effects to the Adhesion |
| --- | --- |
| Toner Composition | By appropriate selection of the toner composition, adhesion of the toner can be controlled. |
| Print Media Surface | By appropriate selection of the media's surface chemistry or surface structure, adhesion of the toner can be controlled. |
| Fusing Temperature | By appropriate control of the fusing temperature, adhesion of the toner can be adjusted as desired (e.g., lowering the fusing temperature can diminish adhesion). |
| Fusing Pressure | By appropriate control of the fusing pressure, adhesion of the toner can be adjusted as desired (e.g., lowering the fusing pressure can diminish adhesion). |
| Some physical or chemical treatments | For example, tension, expansion and/or stress on the media can cause delamination of the toner from the media surface. Corona, plasma and/or radiation treatment can breakdown organic binder components in the toner so that the toner adhesion can be reduced. Temperature drops below room temperature can cause the toner resin to be more glassy and brittle so that it is easier to erase mechanically (e.g., such as by abrasion). |

In accordance with the experience and/or experimentation of the inventors, a well balanced toner adhesion has been achieved which exhibits the following features: 1) the toner can be fused onto the media surface with good image quality; 2) the image fused on the media has a certain desirable degree of abrasion resistant such that normal finger and/or paper rubbing will not remove toner from the media; and, 3) the adhesion of toner to the media surface is not too strong so that a relatively simple mechanical operation (e.g., such as finger nail scratch, a scratch by a sharp object, a scratch under high pressure, etc.) can remove the toner.

As previously described, a printer or other marking engine is disclosed herein that is able to selectively apply various operating parameters. In particular, disclosed herein is a printer or marking engine that is capable of operating at a sufficiently low fusing temperature and/or sufficiently low fusing pressure so that a correspondingly lower degree of fusion of the toner onto the media can be achieved, thereby promoting the ability to substantially remove toner cleanly from the media via mechanical means and/or operations. Optionally, the printer or marking engine can operate while applying either "normal" fusing temperature and/or pressure or reduced fusing temperature and/or pressure. Therefore, the printer or marking engine can be used for both "permanent" applications and removable applications. That is to say, for permanent printing/marking jobs, the normal fusing temperature and/or pressure will be used, and for erasable or temporary printing/marking jobs, the reduced fusing temperature and/or pressure can be used.

Optionally, the printer or marking engine can be dedicated to only printing erasable/reusable media (e.g., as described in this specification). Alternately, the printer or marking engine can use both erasable/reusable media and common media (e.g., such as paper, transparency, etc.). In the latter case, the printer or marking engine can have at least one tray dedicated for erasable/reusable media and at least one tray dedicated for the common or standard media. Additionally, as already described above, the printer can have a build in mechanism or station for erasing the reusable paper or a machine separate from the printer or marking engine can be used for erasing the reusable media.

As is generally known in the art, conventional toners can contain dyes. Moreover, it has been observed that after printing/marking on the erasable/reusable medium in accordance with the present method, a dye sublimation effect can be experienced, e.g., due to the high temperature of the fusing process. In particular, low molecular weight organic dyes have exhibited this dye sublimation effect. In this effect, the dye molecule sublimes from a solid to a gas which then penetrates into the media fiber or resin. After penetrating into the media, it essentially becomes part of the media and can not easily be removed mechanically. In experiments with an HP Color Laser Jet CP1215, the yellow color has exhibited the dye sublimation effect, and after a mechanical erasing process, a slight yellow color ghost image remains visible, e.g., on a white PET (polyethylene terephthalate) based media. Accordingly, to overcome such an issue, it is advantageous that the employed marking agent or toner have colorants that do not contain dyes that are susceptible to the sublimation effect. In this regard, e.g., inorganic pigments can be used, or organic pigments may be used that mainly contain large molecular weight dye(s) or dye molecules anchored on some macromolecular structure. Alternately, the sublimation effect can also be reduced by employing a lower fusing temperature. For most conventional dyes, the sublimation temperature is above 150° C. Accordingly, if the fusing temperature is kept below 150° C., the sublimation effect can be adequately reduced.

Optionally, toner removed during the erasing process is recovered so that is may be reused and/or recycled. The erasing process proposed herein (discussed in greater detail below) suitably abrades or scrapes the toner off the erasable/reusable media. Optionally, the removed toner dust is then collected, such as, in a vacuum filter. Suitably, the toner from the vacuum filter can be collected, and for example, sent back to toner vendors or the like so that the used toner can be regenerated. This is especially useful for black-and-white or monochromatic applications where inter-mixing of different toner colors is not an issue. One known technology of making commercial toner is grinding chunks of color resin into a micrometer size powder. Suitably, such a process may be employed on the recycled toner dust to convert the same back into useful toner powder. Alternately, the toner can be biodegradable. For example, the toner may optionally contain resins that are biodegradable themselves or some additives can be applied to make the resins biodegradable.

In accordance with aspects of at least one embodiment of the present inventive subject mater, suitably, the erasable/reusable media comprises at least one from the following: a film, a paper, a paper-film-combination, etc. Optionally, a coating can be applied on the image receiving surface or side of the media. In case paper is used as part of the media, the paper is optionally coated and sized with polymeric resin or laminated with plastics. In accordance with embodiments of the present inventive subject matter, typical sizing and sealing coatings on paper may include water based, UV based, solvent based, or solvent-less coatings. For example, a water based coating may typically comprise emulsions or dispersions that have polymers that may contain acrylics, urethane, polyester, vinyl polymer, polyolefin, silicone, etc. The paper surface can also be extrusion coated or laminated with a layer of plastic. The plastic layer can be joined to the paper layer with or without the help of an adhesive. Plastics which can be used for this purpose include polyolefins (PE (polyethylene), PP (polypropylene), TPX (polymethylpentene), etc.), polyesters (PET, PETG (polyethylene terephthalate glycol), etc.), polycarbonate, acrylic, urethane, etc.

Suitably, at least one surface of the media is constructed and/or otherwise configured to allow the toner or other marking agent to be repetitively applied and erased. For erasable applications, the image receiving surface of the media is advantageously non-absorbing. In this context, the term non-absorbing is meant to describe a surface that does not have a significantly porous structure, so that toner or other marking agents can not significantly penetrate into the media. However, the media surface can appear to be either smooth (i.e., glossy) or matt (based on the common perception of media, such as glossy photo paper or matt photo paper). Nevertheless, smooth or glossy media may be somewhat more advantages insomuch as it may tend to be easier to clean completely. As is known in the film industry, certain techniques can optionally be used to make a super smooth plastic film surface such as calendering, planarization, sanding, polishing, etc. In one suitable embodiment, where a coating is applied onto a plastic film carrier to serve as the image receiving surface of the media, use of a plastic film carrier with high surface smoothness can help the coating to form a smooth surface.

In studies conducted using an HP laser printer with HP toner and mechanical erasing such as scraping, rubbing, abrasion, etc., it has been found that the following properties are significant for achieving a good reusable application in accordance with at least one embodiment: 1) the toner should be able to print or mark on the media with good image quality; 2) the toner should adhere to the media with enough strength so that normal finger rubbing, or office use will not erase it off; 3) the toner should be able to be erased by abrasion or other mechanical means or operations; 4) the media itself should be able to tolerate repetitive erasures. Optionally, the first property can be tested by conventional or other image analysis after xerographic imaging. The second and third properties are related to adhesion/anchorage of the toner to the image receiving surface of the media. Of course, the adhesion anchorage can be tested. One direct measurement of toner anchorage is abrasion testing. Under abrasion at low pressure and/or slow speed and/or by soft materials, the toner should stay on the print media surface. Under abrasion at high pressure and/or high speed and/or by sharp and/or hard materials, the toner should be abraded off. Simple devices to measure the abrasion values include a Taber tester, Crockmeter, etc.

Having the last property (abrasion resistance) is significant so that the media or media surface can tolerate the mechanical abrasion during the erasing operation and still provide a good surface for the next use. Nevertheless, it is expected that some surface material may be removed during erasure operations. Suitably, such "rub-off" is minimal so that the same surface chemistry can prevail for at least some number of erases so that acceptable printing/marking and erase performance can last during the usable life time of the printable media (e.g., say, at least 10 erases). To this end, there are at least two ways to improve the media's abrasion resistance. One is to improve the hardness of the media's surface material, and the other is to lower the surface friction of the media's surface material.

In embodiments where the toner used tends to have good adhesion to most common plastic surfaces, the surface of the media is optionally made special so that the toner can be removable. It has been found that low surface energy resins on the image receiving surface of the media helps to reduce the degree of adhesion to what is deemed an acceptable range. Such low surface energy resin comprises polymers that contain at least one structure from the following list, silicone, fluoro-carbon, olefin, long chain hydrocarbon, polycarbamate, amide wax, etc.

In one suitable embodiment, the erasable/reusable media comprises a silicone coated substrate. As is generally known, silicone resin is able to be coated onto all kinds of substrates. In the PSA (Pressure Sensitive Adhesive) industry, release liners are constructed using, e.g., such resins from GE Silicones (now know as Momentive Performance Materials), Gelest, Dow Corning, etc. Known silicone release coating systems include water based, radiation based (such as UV or E-Beam), solvent based, and solvent-less systems. Different degrees of cross-linking, thickness, surface energy, release force, degrees of friction can be achieved with the appropriate formulations. For example, to adjust the release force (e.g., as measured by a PSA (pressure sensitive adhesive) tape), additives (e.g., such as a control release agent (CRA)) can be used to increase the release force. Also, the addition of monomer/oligomers that have a higher degree of crosslinking can increase the hardness of the coating. The thickness of the silicone coating can also affect release, friction, durability, etc. Resins that have a hybrid molecular structure, e.g., that include siloxane or other organic or inorganic structures including fluoro-carbonate, acrylic, epoxy, urethane, etc. are also commercially available for use. In addition, other molecular structures can also be incorporated into a siloxane system by blending, crosslinking, etc. The addition of organic or inorganic particles (micrometer, sub-micrometer, or nanometer) can also be used to modify properties of the coating.

Siliconized paper or film commonly employed as release liners in the PSA industry are available with silicone release surfaces having all different kinds of properties. Such siliconized paper or film is optionally used as the erasable/reusable media described herein. Major sources of siliconized paper/film in the USA include: Mitsubishi, Toray, Loparex, CP Films. For example, siliconized surfaces that work well as erasable/reusable media, e.g., with the commercial toner from HP, are available from Mitsubishi Polyester. In particular, Mitsubishi polyester makes a siliconized PET. Such siliconized PET includes 2SLK or 2SLKN for PSA release liner applications as well as 2VC4N. 2VC4N is a silicone coated PET release film designed for casting thin solvent-based ceramic dielectric films with very uniform thickness and smoothness. In accordance with the 2VC4N siliconized PET, one side of the PET is super smooth and coated with silicone (similar to the 2SLKN product) to achieve a low release force smooth siliconized PET surface. The other side has smoothness similar to the base film of 2SLKN. Traditionally, the smooth siliconized surface of the 2VC4N material is used for casting ceramic dielectric film. Of course, alternatively, another siliconized paper or film may be developed, constructed and/or used for the erasable/reusable media.

Optionally, coating and curing the silicone on a plastic film may or may not be combined with the orientation of the plastic film (in-line or off-line). In one suitable embodiment, construction of the erasable/reusable media may employ a known technique for in-line coating a silicone formulation on a plastic such as PET, polycarbonate, polyester, polystyrene, acrylic, urethane, polyether, etc. In accordance with this technique, the film is heated to high temperature and tenter oriented. In this way, a very thin silicone coating (e.g., less than 500 nm, or even less than 100 nm) can be formed. A high degree of silicone curing can be achieved because the film orientation process allows the silicone coating to experience high heat. Whereas, processes that thermally cure silicone on film without orientation may not always heat beyond the film deformation temperature. The high degree of curing gives a silicone surface that has very low silicone migration transfer or rub-off. It is also believed that the high temperature orientation process also allows stronger interfacial interaction (interlocking, diffusion, etc.) between the silicone layer and plastic film layer so that the silicone layer is more durable and abrasion resistant. Optionally, a water based silicone emulsion can be used for this coating so that a thin coat weight can be achieved. Optionally, an adhesion promoter such as silane (including alkyloxy silane, glycidoxy silane, etc.) can be added to improve the adhesion of the coating to the plastic film substrate.

Suitably, the silicone chemistry (e.g., such as that which may optionally be employed in connection with the erasable/reusable media disclosed herein) generally involves using a functional siloxane prepolymer to react with a functional crosslinker under the help of catalysts. The reaction can be additional (e.g., using vinyl functional groups) or condensational. However, a condensational reaction is generally less desirable due to the toxicity of Sn containing catalysts. In any event, the prepolymer can range from low molecular weight to high molecular weight. The prepolymer can be functional only at two end group (for example having vinyl group only at two ends of a long liner chain); or the prepolymer can be multiple functional with additional crosslinking sites. The relationship of prepolymer structure to the final property can be view as follows. In particular, both end-blocked and multifunctional polymers are available in a variety of molecular weights. In general, high-molecular-weight end-blocked polymers yield softer, more elastic coatings with easy release at low peel speeds and higher release at high speeds. Low-molecular-weight and multifunctional polymers, on the other hand, yield harder, less flexible coatings with less differentiation between high- and low-speed release force values.

Most silicone formulations have a particular structure-property relationship. Generally, a high molecular weight prepolymer with end-block function will give a polymer network that has a very low degree of crosslinking. Such a low crosslinking structure gives a soft release coating but generally also has a low coefficient of friction (COF). On the other hand, a low molecular weight prepolymer with multi-function will provide a hard highly crosslinked coating that has a high hardness but also a high COF.

In studies, it has been found that most conventional silicone systems tend to wear poorly and/or lack sufficient abrasion resistance to be used for a high quality erasable/reusable media surface. In particular, the mechanical erasing process proposed herein can easily damage conventional silicone coatings. In particular, a sharp object such as a blade edge can easily cut in to the silicone and remove the silicone coating. Due to the particular structure-property relationship of the silicone formulation (described above), there are two ways proposed hereafter to improve the abrasion resistance of the silicone coating to achieve a media surface suitable for the erasable application described herein.

The first way is to obtain a silicone layer or coating with low crosslinking, which will tend to provide a relatively soft release coating but otherwise has a relatively low COF (which is advantageous in this case). If the low COF is the dominating factor, the low COF will prevent the abrasion tool or eraser (e.g., such as a scraper or doctor blade) from cutting into the silicone coating, but rather it will aid the abrasion tool or eraser to slide on the silicone surface. For the same silicone formulation, a relatively lower COF can be effectively achieved by using a low silicone coat weight. Accordingly, e.g., an in-line siliconization process that allows very thin silicone coatings to be made (e.g., such as around 100 nm or even below 100 nm) is advantageous.

As discussed, one method involves using a high MW (molecular weight) release coating, e.g., such as ones obtainable from Dow Corning, Wacker, etc. In this regard, it is typical that ~500 cps (centipoise) is the maximum viscosity for commercial solventless offerings. In one exemplary embodiment, the following formula may be used for the Si coating proposed for the erasable/reusable medium disclosed herein (with 10% net solids content):

| Component (Supplier - Dow Corning) | Function | Amount (PPH) |
| --- | --- | --- |
| Syl-Off 7817 | Silicone Vinyl Polymer (+Pt Catalyst & Inhibitor) | 9.8 |
| Syl-Off 7048 | Silicone Hydride Crosslinker | 0.2 |
| Heptane | Dilution Solvent | 85.0 |
| Methyl Ethyl Ketone (MEK) | Solvent/Anchorage Aid | 5.0 |

In practice, these components are mixed together and applied to, e.g., an optionally corona treated PET. Suitably, the coating is applied, e.g., using a low wire meyer bar (e.g., #0-#3). After application of the coating, it is cured, e.g., in an oven for approximately 60 secs. at 300° F. In this manner, a cured, silicone coated PET construction is produced that is suitable for use as the erasable/reusable media proposed herein. Optionally, the surface COF could be additionally manipulated by either increasing or decreasing the amount of heptane in the formula (i.e., more dilution will give less coat weight, and hence a lower COF). While an anchorage additive was not included in the above-formula, one could be provided if desired—e.g., a low amount of MEK is useful for this purpose.

More generally, the coating is optionally formed from a formulation including: (i) a silicone vinyl polymer or a silicone silanol polymer; and, (ii) a silicone hydride crosslinker. The coating may be made from a solventless formulation or a solvent containing silicone formulation. Suitably, the viscosity of the solventless silicone formulation is greater than 200 cP.

The second way is essentially opposite from the first way—i.e., it involves making a hard coating on the erasable/reusable media. However, a hard silicone coating (i.e., highly crosslinked) is generally associated with a higher COF. However, if the hardness is a dominating factor, the hard coating could be abrasion resistant too. Accordingly, there are proposed herein a few ways to improve the hardness. First, relatively low molecular weight and high crosslinking functionality (vinyl, silicon hydride, silicone hydroxide, etc.) monomer or oligomers silicone containing resin can be used that can cure to a highly crosslinked network. Second, MQ resin (CRA) can be used to introduce hard structure into the silicone network. A third way is to improve the curing by heating to higher temperature, prolonged curing time, more efficient catalyst system, etc. A fourth way is to use additives such as hard organic or inorganic particles, preferably submicron particles or nano-particles. For example, suitable nano-particles are available such as colloidal silica from Nissan Chemical or from Grace Davison (Ludox). A fifth way is to use silicone resin with hybrid structure that contains other groups like epoxy, acid, hydroxyl, acrylic, isocyanate, methylol, POSS, etc. that can introduce a high degree of crosslinking. In particular, POSS (polyhedral oligomeric silsesquioxane) is available that can have various degree of crosslinking and hydrophobicity. POSS can also be used together with silicone coatings. For example, Gelest sells a POSS based silicone resin product for making an abrasion resistant hardcoating called HardSil. A sixth way is to reduce the silicone thickness (e.g., to less than about 1 um). That is to say, a soft silicone coating coated on a hard substrate may well perform like a hard surface if the silicone coating is very thin. A seventh way is to use an adhesion promoter together with the silicone or as a primer between the silicone coating and the coating substrate. The primer or adhesion promoter can improve adhesion of the silicone based coating to the substrate and thus offer better abrasion resistance. Of course, it is noted that abrasion resistant is not solely related with hardness. For example, a hard and brittle material will not generally have good abrasion resistance.

Additionally, a low surface friction will also improve abrasion resistance. Polyolefins can be applied on the media surface by coating, extrusion, or lamination. Fluoro-carbon containing polymers can be applied on the media surface by coating or by extrusion or by lamination. In general, fluoro-carbon coating polymers compared with silicone based polymers tend to have lower surface friction, higher abrasion resistant. One example of a suitable fluoro-carbon containing coating is a coating (Dow Corning 2601) that is generally designed for anti-graffiti applications.

Chemicals containing silicone, fluoro-carbon, olefin, long chain hydrocarbon, amide, wax can also be incorporated in the media surface as additives instead of as polymeric binder materials. The binder materials can be any kind of polymer or coating including: thermal plastic or thermal-set, polycarbonate, acrylic, polyester, urethane, polyolefin, silicone, Teflon® (i.e., polytetrafluoroethylene (PTFE)), etc. As additives, the chemicals containing silicone, fluoro-carbon, olefin, long chain hydrocarbon, amide, wax can give the media surface desired properties. For example, silicone oil, pre-crosslinked silicone particle, silicone containing surfactants, fluoro-carbon particles, fluoro-carbon surfactant, wax particles, oil, hydrocarbon wax, amide wax, etc. can be incorporated into a coating or film as additives. Such additives can give the surface slippery, low friction, anti-block, abrasion resistance, as well as release properties.

Suitably, the surface layer of the media comprises a film only. In one possible embodiment, the whole construction of the media can be one film. The film can be extruded, coextruded, laminated, cast, etc. The film can be thermal plastic or thermal-set. The film materials can my any kind of plastic film including polyester, polycarbonate, polyolefin, polysulfone, etc. Slip agents can be added into the film to provide desired abrasion resistance, degree of adhesion and release, low friction, etc. Common industrial slip agent typically comprise silicone containing chemical, fluoro-carbon containing chemical, long chain hydrocarbon containing chemicals, olefin wax, amide wax, inorganic particles (silica, alumina, etc.), lubricating oil, etc. For the slip agents that are liquid, continuous migration of slip agent to the surface can be expected, even after the slip agent at the surface is wiped off. It is to be understood that with the right kind and sufficient amount of slip agents, a film surface can have the appropriate adhesion, release and abrasion resistance for the print and erase applications described in this specification.

In any event, suitably, the kinetic Coefficient of Friction (COF) of the coated surface (i.e., the surface intended to receive markings) relative to a stainless steel plate is less than about 4 in one embodiment, or less than about 2 in another embodiment, or less than about 1 in still a further embodiment, or less than about 0.5 in still another embodiment, or less than about 0.3 in yet one more embodiment. Suitably, the foregoing kinetic COF measurements can be obtained using an IMASS SP-2000 Slip/Peel Tester (IMASS Inc., Accord, Mass.) with a 200 g sled on a stainless steel plate, a 5 kg cell, a 4 sec delay setup, a speed of 6 in/min, a run for about 50 sec average, and a sample cut to a size of about 4"×5" which is attached to the sled.

In the embodiments where the toner used tends to have poor adhesion to most common plastic surfaces, special toner is optionally formulated and made to have poor structural integrity and/or poor adhesion to plastic or paper surfaces. Such specially made toner will be described in greater detail below. However, in this case, many common plastic films or coatings can be used for the erasable/reusable media described herein. These films include thermal plastic or thermal-set, polycarbonate, acrylic, polyester, urethane, PVC (polyvinyl chloride), etc. The coatings can be urethane, vinyl, acrylic, etc. However, it is still desired that such film or coating have enough abrasion resistance to endure as many mechanical erases as possible.

Suitably, the media also has good heat dimension stability as xerographic imaging generally employs heating of the toner to fuse the toner to the media surface. For example, it can be desirable for the print media to have a dimensional change of less than 4 percent (or optionally below 1 percent) in both directions after heating to 100 degrees C. for 10 minutes.

Additionally, the film and paper used in the construction of the media can optionally be made from renewable supply (agriculture), such as PLA (polylactide) polymer, or made to be recyclable or biodegradable. For most polymers that are not otherwise biodegradable, additives can be included to can help to make the resins biodegradable. It has been generally accepted that siliconized film (such as siliconized polyester, polycarbonate, etc.) can not be recycled, i.e., because the silicone component made the polymer unable to be recycled. However, the siliconized film in this application may still be recyclable in large part because of the very thin silicone coating being used on a relatively thick polymer film. For example, if the silicone coating is 100 nm on a polyester film of 100 um, assuming the silicone and polyester have similar density, then the weight percent of the silicone in the polymer is about 1:1000. With such as ratio, the silicone may be ignored, or some process can be employed to remove the silicone, e.g., such as flame treatment of the siliconized surface or some other silicone removing treatment.

Suitably, at least one of the media surfaces have antistatic or static dissipative properties. Without such static control properties, the media can be hard to handle, e.g., by devices and/or by users. For example, in one suitable embodiment, it is desired that the surface resistivity be somewhere between about $10^6$ to about $10^{15}$ Ohm/Square. Optionally, in another suitable embodiment, it is desired that the surface resistivity be somewhere between about $10^6$ to about $10^{13}$ Ohm/Square. Optionally, in still another suitable embodiment, it is desired that the surface resistivity be somewhere between about $10^6$ to about $10^{11}$ Ohm/Square. Optionally, an antistatic and/or static dissipative agent can be added to the construction of the erasable/reusable media. The additives can be hygroscopic materials, quaternary ammonium materials, or semiconductive particles (mostly particles of semiconductive metal oxides).

In one exemplary embodiment, the erasable/reusable media has some stiffness and mechanical strength to tolerate the handling by user's hands as well the printing/marking and erasing processes. A thick and/or stiff construction also helps the user to differentiate the special "media" against normal printing media. If plastic film is used as the main construction, the plastic film suitably has some minimum thickness. For example, if white polyester film is used as the main media core material, the polyester film may be, e.g., at least 2 mil thick and preferably 3.5 mil thick. Optionally, the polyester film includes, e.g., a $TiO_2$ whitening or $BaSO_4$.

Alternately, a paper/film laminate construction may also be used as the core structural material of the media. For example, such a laminate construction has the following advantages: 1) higher stiffness and mechanical strength due to the composite laminate structure, 2) good thermal stability of the paper and surface smoothness of the film, and 3) lower cost due to the use of low cost paper. However, if paper is used, it is advantageous that a sandwich construction of film/paper/film is used, insomuch as comparatively a mere binary construction of film/paper typically has curl issues associated therewith. However, a binary construction of film/paper may be made by laminating a plastic film on a paper. Likewise, a sandwich construction of film/paper/film may be made by laminating plastic film on two sides of a paper with suitable surface coating sides facing out. The plastic film may be one-side surface coated before or after the lamination. Optionally, the lamination may use lamination adhesive. Heat seal adhesive may also be used. The lamination adhesive may be applied by extrusion, by coating (water based, solvent base, radiation based, etc.).

In general, one side of the media can be treated for erasable applications. In this case, the other side may allow permanent writing or printing. Alternatively, both sides of the media can be treated for erasable applications. In one embodiment, the media can be white plastic film coated with a silicone coating. The white plastic film could be polyester, polycarbonate, PEEK (polyether ether ketone), polyolefin, polyamide, polyimide, and other polymers with strong mechanical strength. The films can be made white due to addition of whiting agent such as $TiO_2$, $BaSO_4$, $CaCO_3$, etc. Cavities can be formed in films that can also provide an opacity effect. For example, $CaCO_3$ is typically used as a cavitating agent. The white film can have one side or both sides silicone coated.

As can be appreciated, most of the media constructions discussed above have a slippery surface that may be hard to handle by printing/marking and/or erasing devices. For example, a normal paper supply tray typically has a media pickup device, which can have paper jam issues if siliconized film is used in the tray. Accordingly, in accordance with aspects of the present inventive subject matter, it is advantageous that a special paper handling mechanism may be implemented in the printing and/or erasing devices. For example, high friction rollers can be used that do not slip on the slippery media surface. Or, the media may have a high friction edge. The high friction edge can be made either by having a high friction material (rubber, paper, etc) on the surface of the edge or by having a rough surface. The rough surface can be made by embossing, etc. Alternatively, holes or sprocket holes can be formed on the edges of the media. The holes can help to feed and guild the media, e.g., during printing/erasing. The holes can also be used later to selectively bind sheets of the media together.

As mentioned above, optionally, the erasable/reusable media maybe constructed or otherwise configure with a sacrificial coating or layer on the image receiving surface or side of the media. Suitably, the sacrificial coating is a material to be applied as a coating onto the media. For example, the coating application can happen after each (or some) erase(s) or before each (or some) printing(s) or marking(s) or during each (or some) printing(s) or marking(s) but before the fusing or transfer step. Essentially, the sacrificial coating improves the receiving/release property of the media. In operation, during each erase, at least a portion of the sacrificial material is intentionally removed together with the toner or other marking agent forming an image on the media, and accordingly, it is referred to as "sacrificial". However, after one or more erasing operations, because some or all of the sacrificial material has been removed from the media, more of the sacrificial material is optionally reapplied, e.g., at station 50. Considering the sacrificial coating is removed, this coating can optionally be absorbing (i.e., with a rough or porous structure). In this way, the coating can facilitate the reception and erasing of toner or other marking agents.

Optionally, the sacrificial coating can be a water-based or solvent-based coating (e.g., using an organic solvent that has low health risks) and thus the coating process may incorporate a drying step. Alternately, the coating may not include water or solvent. For example, in one embodiment, the coating can be a continuous or non-continuous coating of a special toner (e.g., clear or white color) and be coated on the media using a xerographic process. In another embodiment, the sacrificial coating can be a material that is liquid at high temperatures and solidifies at lower temperatures. Accordingly, it can be applied as liquid at high temperature and function as a solid at lower temperature. For example, wax can provide such melting characteristic. In another embodiment, the coating can be in the form of oil, grease, or wax that can be smeared, rubbed, or brushed onto the surface or image receiving side of the media. The chemical structure of the sacrificial coating or layer may optionally include silicone, fluoro-carbon, long-chain hydrocarbon, etc. Optionally, organic (pre-crosslinked resin particle) or inorganic particles (silica, alumina, talc, TiO2, CaCO3, etc.) may be added to the coating formulation. The particles function as a spacer so that the during the toner fusion step of the marking process, the melted toner will have less interaction with the media surface under the sacrificial coating. The particles may also help the mechanical removal by reducing the structural integrity of the sacrificial coating and also can function as abrasive particles during erasing.

Optionally, at, on or under the surface of the erasable/reusable media some permanent printing or markings or other indicia may be applied that will not be removed by the erasing operation, e.g., as applied by the erasing station 60. For example, the indicia may indicate that the media is a special one designed for erasable and/or reusable applications. Suitably, it can serve the function of media type discrimination, i.e., informing the user and/or system 10 which media is for normal or standard printing or imaging (i.e., so called permanent jobs) and which media is for erasable printing or imaging (i.e., so called temporary jobs). For example, these markings or indicia may be read and/or otherwise used by the media type detection station 30 to determine what type of media a particular sheet is made from, i.e., standard media or erasable/reusable media. Optionally, a special bar code or other substantially unique identifier can also be permanently printed or marked on sheets of the erasable/reusable media in order to identify and/or keep track of them. In one suitable embodiment, e.g., the system 10 may monitor the bar codes or other identifiers in order to keep track of how many times a particular sheet is used. In this way, sheet use tracking may optionally be maintained by the system 10 rather than indicating the number of uses on the sheet itself.

Suitably, in embodiments where the marking agent comprises a toner, the toner is able to solidify on the surface of the erasable/reusable media to have controlled adhesion. Ideally, the adhesion is high enough so that normal abrasion or usage will not remove it from the media—however, it can be removed with a designated mechanical removal operation (e.g., strong rubbing, abrasion, scratching, scraping, etc.) or other suitable erasing operation applied to the media, e.g., by the erasing station 60. In practice, toner works well on film based or coated media where the surface is substantially non-absorbing. Typical toners are mainly made of low molecular weight resins and colorants (e.g., pigment or dye). The low molecular weight resins are mainly acrylic polymer, styrene acrylic, polyester based, etc., and there may be other additives such as rosin, rosin derivatives, silica, etc. Generally, the toners are made into micrometer size particles.

To make the toners more susceptible to erasing (e.g., by the mechanical erasing described herein), a few method can be used. First, a release agent can be added to the toner composition. Suitably, release agents are materials that comprise molecular structure(s) from the following group: silicone, fluoro-carbon, long-chain hydrocarbon, amide, etc. Optionally, the release agent may come in solid or liquid form as desired. Functionally, the release agent prevents good fusion of the toner to the image receiving surface of the media, and it also prevents good fusion between the toner particles. Second, special particles can be added to the toner formulation. For example, these special particles can include inorganic particles (such as silica, alumina, talc, $CaCO_3$, etc.) or organic particles that either have a melting temperature (or glass transition temperature or softening temperature) higher than the toner resin or that are pre-crosslinked and thus tend to not melt at all. The melting temperature of common toner resin is between 80° C. and 140° C. Accordingly, suitable organic particles that have very high melting temperatures (i.e., above the aforementioned range) include, for example, polyamide wax, TPX, Teflon®, PVC, etc. Suitable examples of pre-crosslinked organic particles include crosslinked silicone powder from Dow Corning, Epostar powder from Nippon Shokubai, Daiplacoat crosslinked PU (polyurethane) powder from Dainichiseika Color & Chemicals, etc. Third, resins with melting temperature on the high end of the typical toner melting range (80° C. to 140° C.) or lower melt flow (higher flow viscosity at melt) can be used. Fourth, lower amounts of resin in the toner compared with color pigment will also give lower adhesion strength to the fused toner. In one exemplary embodiment, the erasable toner or other marking agent includes a release agent with a weight percent greater than about 1%, wherein the release agent includes at least one of silicone, fluoro-carbon, organic pre-crosslinked particles or organic thermal plastics particles with a melting temperature greater than 200° C. Optionally, in another embodiment the release agent has a weight percentage greater than about 3%, or in still another embodiment a weight percentage greater than about 5%.

In one suitable embodiment, preferably at least 50% of the toner or other marking agent is erased (e.g., at the erasing station 60) by rubbing, brushing, abrasion, scraping, scratching, etc. (which is generally referred to herein as "mechanical" removal or erasing). Optionally, other additional removal steps and or processes by other means such as heat transfer, solvent washing, etc. can be combined with the mechanical removal and/or otherwise implemented as well. Suitably, the removal maybe done in a "recycle/erase" machine or device separate from the printer or marking engine or build-in with the printer or marking engine (e.g., as shown in the system 10).

In general, a sheet of the erasable/reusable media is feed in from a tray or as shown in FIG. 1 received by the erasing station 60 along a suitable paper path or media routing path.

Figure 2:
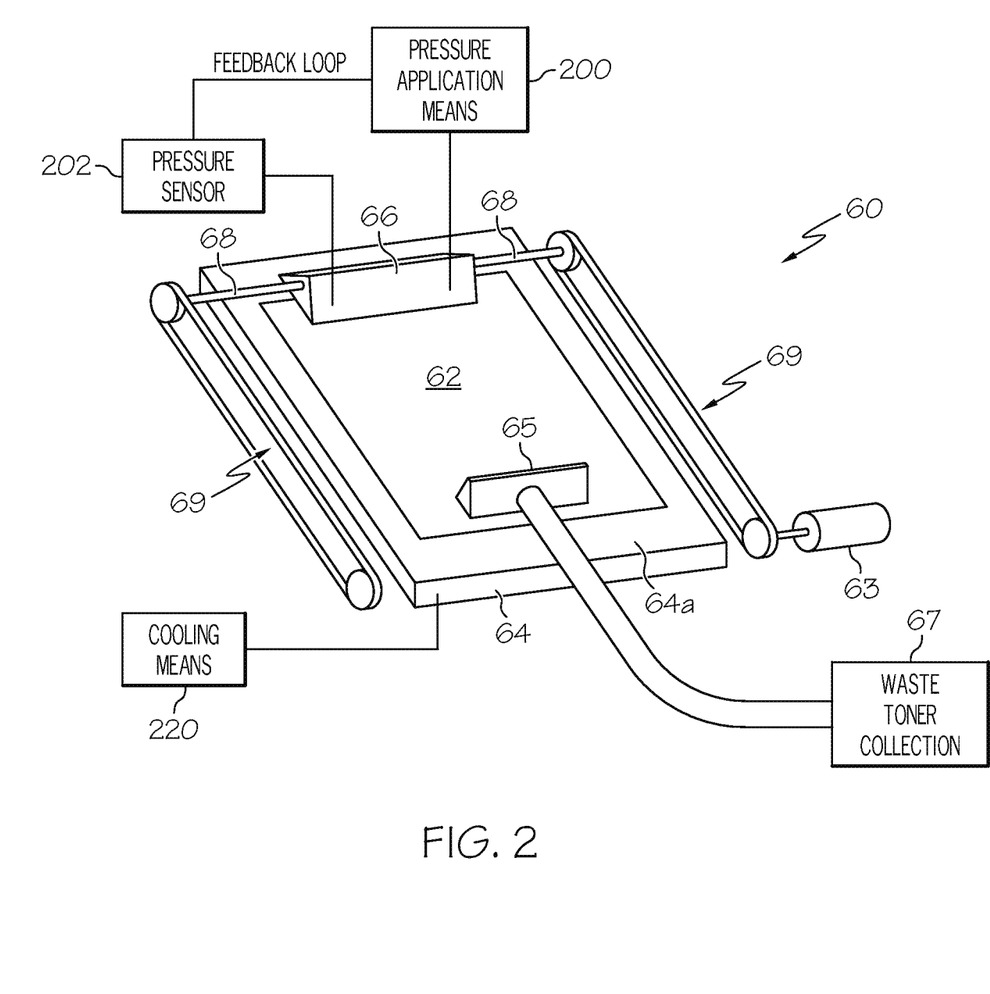
FIG. 2 is a diagrammatic illustration showing an exemplary erasing station and/or apparatus in accordance with aspects of the present inventive subject matter.

With reference now to FIG. 2, there is shown an exemplary erasing station 60. Once received, the erasable/reusable sheet of media 62 is optionally fixed on and/or otherwise held by a media support 64, e.g., having as shown in FIG. 2 a flat surface 64a or alternately a curved or a drum surface. Suitably, the media 62 is fixed to and/or held by the support 64 via any one or more of the following: static, a vacuum, low degree adhesion, friction, nip pressure, sprocket holes on the media 62, etc.

In the embodiment shown in FIG. 2, the eraser 66 is positioned or otherwise arranged over and/or otherwise proximate to the media 62 so as to be in contact with the image receiving surface or toner bearing side of the media 62. In the illustrated embodiment, linkage 68 operatively connects the eraser 66 to a motorized (e.g., via motor 63) or otherwise powered drive assembly 69 which pulls, pushes and/or otherwise moves the eraser 66 across and/or over the contacted surface of the media 62, thereby scraping, scratching, rubbing, brushing, abrading and/or otherwise mechanically removing the toner or other marking agent from the contacted surface of the media 62. Optionally, where a sacrificial layer or coating has been employed on the media 62, this operation may also intentionally remove all or some portion thereof.

Suitably, the removed toner (along with any optionally removed sacrificial material) comes off as a solid dust. Accordingly, the erasing station 60 is optionally equipped or otherwise provision with a suitable vacuum 65 or the like that sucks, captures and/or otherwise removes the dust from the media 62. Alternately or in addition, the erasing station 60 is equipped and/or provisioned with a brush or other wiping device that brooms, rubs or wipes the dust off the media 62. Optionally, the recovered dust and/or toner is deposited in a collection receptacle 67 from which it can be selectively recycled or otherwise disposed of. If recycled, the collected dust and/or toner may optionally be cleaned or reconditioned before being retuned to the marking station 70 for reuse. In any event, once the media 62 has been erased, it can be released from the support 64 and fed into another tray for cleaned media or fed into the appropriate paper path or media routing path for further processing, e.g., it may be forwarded to the marking station 70 for additional reuse.

As shown in FIG. 2, the eraser 66 takes the form of a blade drawn across the tone bearing surface of the media 62. However, in practice, the eraser is optionally implemented as any object that will press or contact and translate or move relative to the surface of the media 62 to at least partially remove the toner or other marking agent therefrom. As the eraser 66 contacts the surface of the media 62 to perform the mechanical removal of toner or other marking agents, suitably, the eraser 66 engages on the contacted surface of the media 62 with some controlled pressure, e.g., that can be adjusted via means 200 either mechanically or electronically. Suitably, the pressure is high enough to have effective toner removal but not too high to damage the media 62. Optionally, the pressure is applied by means of a motor, a cam, a roller, a lever, a weight, a solenoid, etc. In one embodiment, a pressure sensor 202 is used to provide feedback control of the applied pressure.

In the illustrated embodiment, the eraser 66 is moved relative to the media 62 while the media 62 remains stationary on the support 64. However, in practice, the media 62 can moved relative to a stationary eraser 66 or both the eraser 66 and the media 62 can be moved relative to one another. For example, a desired movement of the media 62 can be achieved via suitable motorized or other driving of the media support 64 holding the same. To facilitate placement and/or removal of the media 62 on and/or from the support 64 as well as to achieve the desired contact and/or pressure when erasing is to be preformed, optionally the eraser 66 can be lift up (i.e., away from) or down (i.e., toward) relative to the support 64 or the support 64 can be lifted up (i.e., toward) or down (i.e., away from) relative to the eraser 66 or both can be provisioned for relative movement away and/or toward one another. That is to say, when the media 62 is being loaded onto and/or removed from the support 64, optionally the eraser 66 and/or support 64 are moved and/or positioned relative to one another so as to form a gap therebetween which provides sufficient clearance for the media 62 to be arranged on the surface 64*a* of the support 64. Then at or about the time when the erasing operation is ready to begin, the eraser 66 and/or support 64 are moved and/or positioned relative to one another such that the eraser 66 makes the desired contact with the toner bearing surface of the media 62. Finally, at or about the time when the erasing operation is finished, the eraser 66 and/or support 64 are moved and/or again positioned relative to one another so as to form a gap therebetween which provides sufficient clearance for the media 62 to be removed from the surface 64*a* of the support 64.

In practice, optionally the eraser 66 is initially engaged with the media 62 some distance past or after the leading edge of the media 62 so that the media 62 will not be ripped off the support 64 when the erase 66 is drawn across the media 62. In another embodiment, the front and/or other edges of the media 62 are optionally inserted or otherwise protected under a cover or other like protective barrier or means that bars contact between the eraser 66 and the covered or inserted portion of the media 66 to prevent the media 62 from being ripped off the support 64 by the relative movement of the eraser 66. In this embodiment, suitably, when the relative movement of the eraser 66 begins it slides easily over the cover or the like and then lands on the toner bearing surface of the media 62. Suitably, in this embodiment, the distance between the support 64 and eraser 66 can be fixed so that neither has to be provisioned to move toward and/or away from one another.

While FIG. 2 suggests a relatively simple motion for the erase 66 with respect to the media 62, in practice a more complex movement can be applied. For example, the eraser 66 may optionally comprise a disk, a belt, a cylinder, or a cone that can rotate or spin while at the same time moving relatively across the contacted surface of the media 62. Alternately or in addition, a vibration motion can also be applied to the media 62 or the eraser 66. For example, the vibration motion can be a slow frequency or a high frequency, including ultra-sonic vibration.

As shown in FIG. 2, for scraping or scratching, the eraser 66 optionally takes the form of a single blade. Alternately, an array of blades, or one or more other tips can be used which press onto and/or move across the toner bearing surface of the media 66. Suitably, the blade or tips can be made of metals including stainless steel, brass, copper, aluminum, etc. The blade or tips can also comprise thermal plastic or thermal set polymeric material such as PEEK, polyester, acrylic, styrene, HDPE (high density PE), LDPE (low density PE), PP, Polyether imide, Polyamide, Nylon, ABS (acrylonitrile butadiene styrene), etc. The blade or tips can also be made from composite materials such as ceramic, carbon black, or fiber reinforced polymeric materials. The blade or tips can optionally have all kinds of geometrical shapes and/or various bevel angles. In one suitable embodiment, any one or more of a selection of special doctor blades from a leading company (such as Allison Systems Corporation) can be used for the eraser 66.

In any event, suitably the blade or tip is designed such that with an appropriate application of enough pressure on the toner bearing surface of the media 62, the blade scrapes off the toner but is not too sharp to damage the media 62. Suitably, the blade is spring loaded or the blade itself can be a spring to achieve the desired pressure while engaging the toner bearing surface of the media 62 at a suitable angle. Optionally, to guard against damage to the blades or sharp tips by environmental dust or other objects on the contacted surface of the media 62, a preliminary cleaning (for example by brushing) may be performed before the media 62 is sent to the blade(s) or sharp tip(s). Alternatively, a scanning, observation and/or other evaluation of the media 62 can be done; and if it is determined that a particular sheet of media 62 will damage the erasing mechanism, then that sheet can be rejected.

Figure 3A:
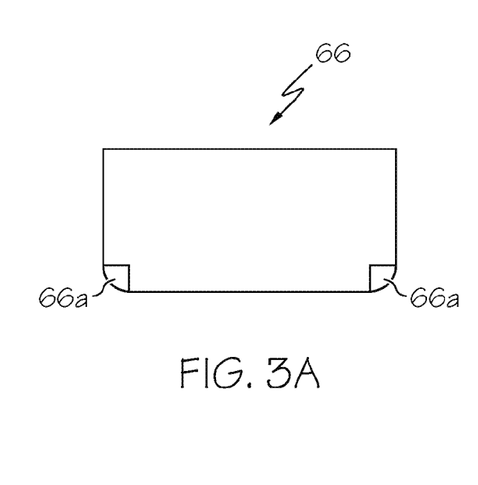
FIGS. 3A and 3B are diagrammatic illustrations showing exemplary blade type erasers having corners in accordance with aspects of the present inventive subject matter.
Figure 3B:
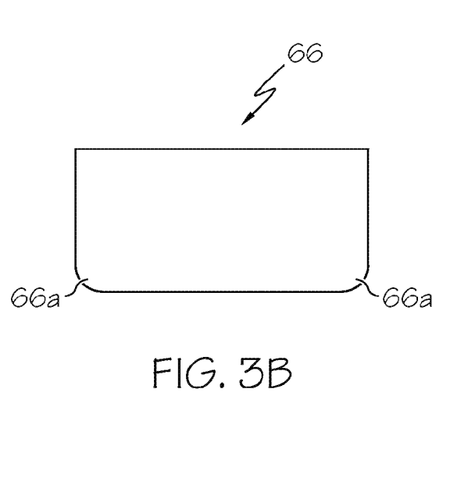

With reference now to FIGS. 3A and 3B, there are shown exemplary blade type erasers 66 suitable for use in the present application. It has been found that blades with sharp corners can tend to cut, tear or rip the media 62 when they advanced across the same. Accordingly, it is advantageous that a blade type eraser 66 does not have a sharp corner. Accordingly, as shown in FIG. 3A, the corners 66a of the media contacting edge or side of the blade have been turned-up slightly so as to curve away from the toner bearing surface of the media 62. Alternately, as shown in FIG. 3B, the corners 66a of the media contacting edge or side of the blade have been rounded-off slightly so as to not contact a sharp corner with the toner bearing surface of the media 62.

In yet another suitable embodiment a brush, a rubbing element, or a felt can be used as the eraser. In this case, the materials used for the eraser are optionally soft so that the eraser will not damage the media. Suitably, the brush, rubbing element, or felt can be a cylindrical roll that spins with the roll surface touching the media or a flat disk (circular or non-circular) that spins with the flat surface touching the media. For example, spinning may be at a rate between 10 Hz to 10 kHz. In case heat is generated due to the friction created between the spinning eraser and the media, a cooling mechanism 220 is optionally employed. For example, cooling may be achieved by a blower that generates a cooling air flow, by thermal-electrical cooling, by refrigeration, or simply by heat conduction via a good thermal conductor to a sufficiently large thermal mass. It is to be appreciated that heating is generally not desired in this context because it can cause melting of the toner which can then be smeared around on the media or the melted toner can even contaminate the eraser itself. As already mentioned, the brush, rubbing element or felt can also be in the form of a belt. In this case, rollers can optionally move to move the belt to introducing a rubbing, brushing and/or scraping motion against the toner bearing surface of the media. Alternately, the brush, felt, or rubbing element can also be in the form of a flat surface or a narrow strip. With suitable pressure (even without spinning or rotating), the erase is able to scrape/brush/rub on the media to erase the toner therefrom. For example, in this way, the eraser can act similar to an eraser for a dry-erase white board.

It is to be understood that because the erasing method involves mechanical rubbing, scraping, brushing, etc., undesired static charge may be generated by this process. Accordingly, the erasing station 60 is optionally equipped and/or provisioned to eliminate or otherwise deal with this static charge. For example, the static charge may be handled via: corona treatment, static charge reception/discharge and grounding, etc.

In one exemplary embodiment, the easer does not have to contact the media 62. Rather the eraser can be an energy source that focuses or otherwise directs radiant energy onto the sheet of media 62 to remove the toner or marking agent therefrom. For example, the erase optionally focuses or otherwise directs laser, sonic or other radiant energy at the media 62 which causes the toner to be removed therefrom. Suitably, the radiant energy is chosen and/or otherwise manipulated so as to be selectively absorbed otherwise interact with the toner, e.g., as opposed to the media itself.

It is to be appreciate, that optionally the erasable/reusable medium described herein is optionally constructed and/or otherwise configured be imaged on one or both sides thereof. Accordingly, the erasing station 60 is optionally equipped or provisioned to erase either one or both sides of the media. Suitably, via known media handling techniques, the media may simply be flipped as appropriate to present the side being erased to the eraser 66. Alternately, a pair of erasers may be employed to erase the respective sides of the media. Suitably, if otherwise two-sided media is in fact only printed, marked or imaged on one side, optionally the evaluation station 40 or the like is able to decide which side to erase, and accordingly, media is presented to the erasing station 60 in the appropriate orientation (i.e., with the side to be erased facing the eraser 66).

Figure 4:
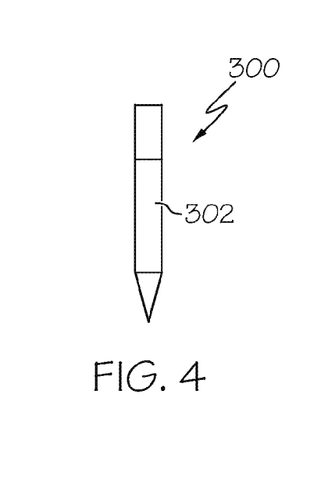
FIG. 4 is a diagrammatic illustration showing an exemplary hand-held writing instrument, such as a pen, containing an erasable marking agent in accordance with aspects of the present inventive subject matter.

The uses for the embodiments described herein and/or their equivalents are many For example, any matter that is desired to be printed but only for a limited period of time can be achieved with these embodiments. For instance, newsletters or other periodicals (e.g. newspapers, magazines) could be downloaded via the Internet and printed by an individual reader in a temporary manner as disclosed herein. Of course, this can be done on a continuous basis, repeatedly using the same sheet or sheets of media that have been intermittently erased with the marking agent removal method as described herein. In this manner, the environmental impact of the printing is reduced to almost zero because the "paper" is recycled over and over again. The user could thus read each days' newspaper or any periodicals in the morning, where it may have been automatically downloaded overnight and printed, and then reload the sheets into the printer, where the ink would eventually be erased with a erasing unit integrated in the printer with the mechanisms disclosed herein and the sheet would thus become ready to be printed upon again. A user could print other matter as well, for instance temporary signs such as "For Sale" signs. Temporary ID cards could also be issued in this manner, such as visitor badges, airport boarding passes, etc. Schools could print all sorts of materials with the embodiments disclosed herein, such as short term handouts and examination sheets. In a still further embodiment, students could be given pens or other like hand-held writing instruments 300 (see FIG. 4) filled with disappearing ink to temporarily mark or write out their answers on such examination sheets. In an alternate embodiment, the writing instrument 300 could be filled with a marking agent 302 (e.g., such as those described herein) which is erasable from the reusable medium, e.g., using the same erasing process carried out by the erasing station 60. Accordingly, on a document (e.g., printed by the marking station 70), an individual could provide editorial comments, write on or otherwise mark the erasable/reusable media as desired with such a writing instrument 300, and the corresponding marks could later be erased with the rest of the document.

In further uses of the embodiments described herein, books can be printed temporarily. Users could be provided with kits including a printer, printing substrates/paper and binding means to enable the users to print books on the reusable paper and optionally bind into a book. Once the user has finished reading the book, the pages can be unbound and reused to print another book. The binding and unbinding can alternatively be a function performed by the printer at the user's discretion. Further functions provided by the printer can include applying a barrier layer onto a printed sheet, sealing the barrier layer, and erasing markings on the barrier layer such as by differential wetting with a second liquid (separate and different from the disappearing inks) or a wiper roller.

Other office accessories can be configured to work with the reusable print media. For example, special erasable writing instruments, pens, or high lighter can be configured to work with the reusable print media. Sheet protectors can be used with the print media to protect the print media for even prolonged reading, transportation, or more rough usage. The print media could already have punch holes so that they can be put in a binder.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. An erasable image receiving medium comprising:
a substrate comprising paper; and
a coating providing an image receiving surface on the substrate, the coating able to (i) receive a marking agent forming an image on the image receiving surface and (ii) allow the marking agent to be selectively removed from the image receiving surface in response to an applied erasing operation, wherein the image receiving surface exhibits a kinetic coefficient of friction while moving at about 6 in/min relative to a stainless steel plate, of less than about 0.3, and the medium exhibits a surface resistivity of between about $10^6$ to about $10^{13}$ Ohm/Square, and the coating comprises at least one of silicones, fluorocarbons, olefins, long chain hydrocarbons, amides, and waxes.

2. The erasable image receiving medium of claim 1, wherein the coating comprises a polymeric binder material other than silicones, fluorocarbons, olefins, long chain hydrocarbons, amides, or waxes.

3. The erasable image receiving medium of claim 1, wherein the medium comprises permanent marking or other indicia to indicate the medium is for reusable applications.

4. The erasable image receiving medium of claim 1, wherein the medium contains at least one edge having a relatively high friction.

5. The erasable image receiving medium of claim 1, wherein the medium further comprises:
at least one counting indicator to communicate the number of reuses the medium has experienced, wherein the counting indicator includes markings or indicia on the medium.

6. The erasable image receiving medium of claim 1, wherein the medium defines holes along the edges of the medium.

7. The erasable image receiving medium of claim 3, wherein the permanent marking comprises a bar code.

8. A method of using an erasable image receiving medium, the method comprising:
providing an erasable image receiving medium including (i) a substrate comprising paper, and (ii) a coating providing an image receiving surface on the substrate, the coating able to (a) receive a marking agent forming an image on the image receiving surface and (b) allow the marking agent to be selectively removed from the image receiving surface in response to an applied erasing operation, wherein the image receiving surface exhibits a kinetic coefficient of friction while moving at about 6 in/min relative to a stainless steel plate, of less than about 0.3, and the medium exhibits a surface resistivity of between about $10^6$ to about $10^{13}$ Ohm/Square;
applying a marking agent on the image receiving surface of the erasable image receiving medium to thereby form an image on the medium; and
subjecting the medium to an applied erasing operation in which at least one erasing blade is contacted with the marking agent applied on the surface of the medium, and the at least one blade is moved relative to the marking agent such that the marking agent is removed from the surface of the medium, wherein the marking agent is removed from the surface of the medium as a solid dust.

9. The method of claim 8, wherein the medium comprises permanent marking or other indicia to indicate the medium is for reusable applications.

10. The method of claim 8, further comprising:
after the applied erasing operation, evaluating whether the medium is fit for further reuse, whereby if determined to be fit for reuse, the medium is forwarded to a tray or marking station, and if determined to be unfit for reuse, the medium is subjected to another applied erasing operation.

11. A system for reusing paper in a marking operation, the system comprising:
an erasable image receiving medium including (i) a substrate comprising paper, and (ii) a coating providing an image receiving surface on the substrate, the coating able to (a) receive a marking agent forming an image on the image receiving surface and (b) allow the marking agent to be selectively removed from the image receiving surface in response to an applied erasing operation, wherein the image receiving surface exhibits a kinetic coefficient of friction while moving at about 6 in/min relative to a stainless steel plate, of less than about 0.3, and the medium exhibits a surface resistivity of between about $10^6$ to about $10^3$ Ohm/Square;
an erasing station that selectively removes at least a portion of the marking agent from the image receiving surface of the medium, the erasing station including (i) at least one blade that is contacted with and moved relative to the marking agent such that the marking agent is removed from the surface of the medium, and (ii) provisions for moving the at least one blade relative to the marking agent.

12. The system of claim 11, wherein the medium comprises permanent marking or other indicia to indicate the medium is for reusable applications.

13. The system of claim 11, further comprising:
a marking station that selectively applies a marking agent on the image receiving surface of the medium to thereby form an image.

14. A method of printing on an erasable image receiving medium containing a previously deposited marking agent, the method comprising:

providing an erasable image receiving medium including (i) a substrate comprising paper, and (ii) a coating providing an image receiving surface on the substrate, the coating able to (a) receive a marking agent forming an image on the image receiving surface and (b) allow the marking agent to be selectively removed from the image receiving surface in response to an applied erasing operation, wherein the image receiving surface exhibits a kinetic coefficient of friction while moving at about 6 in/min relative to a stainless steel plate, of less than about 0.3, the medium exhibits a surface resistivity of between about $10^6$ to about $10^{13}$ Ohm/Square, and the medium further includes (iii) a marking agent deposited on the image receiving surface;

removing the marking agent deposited on the image receiving surface of the medium by contacting and moving at least one erasing blade relative to the marking agent such that the marking agent is removed from the surface of the medium as a solid dust, to thereby produce a medium sufficiently fit or free of the marking agent;

transferring the medium sufficiently fit or free of the marking agent to a printing station for subsequent deposition of marking agent thereon; and printing marking agent on the image receiving surface of the medium.

15. The method of claim 14, wherein the medium comprises permanent marking or other indicia to indicate the medium is for reusable applications.

16. An erasable image receiving medium comprising:

a substrate comprising paper or film; and a coating providing an image receiving surface on the substrate, the coating able to (i) receive a marking agent forming an image on the image receiving surface and (ii) allow the marking agent to be selectively removed from the image receiving surface in response to an applied erasing operation, wherein the image receiving surface exhibits a kinetic coefficient of friction while moving at about 6 in/min relative to a stainless steel plate, of less than about 0.3, and the medium exhibits a surface resistivity of between about $10^6$ to about $10^{13}$ Ohm/Square, and the coating comprises at least one of silicones, fluorocarbons, olefins, long chain hydrocarbons, amides, and waxes; and wherein the medium contains at least one edge having a relatively high friction.

* * * * *